United States Patent [19]

Howbrook

[11] 4,240,065
[45] Dec. 16, 1980

[54] POSITION SENSING APPARATUS

[75] Inventor: Ernest Howbrook, Cheadle Hulme, England

[73] Assignee: Wigmore Professional Data Services Ltd., London, England

[21] Appl. No.: 969,214

[22] Filed: Dec. 13, 1978

[51] Int. Cl.$^3$ .................. G08C 21/00; H04N 1/00
[52] U.S. Cl. ........................ 340/146.3 SY; 178/18
[58] Field of Search .............. 178/18, 19; 333/148, 333/149, 154; 324/233; 33/1 M; 116/230; 340/146.3 SY

[56] References Cited

U.S. PATENT DOCUMENTS

| | | | |
|---|---|---|---|
| 3,466,646 | 9/1969 | Lewin | 178/19 |
| 3,535,447 | 10/1970 | Wollrich | 178/18 |
| 3,598,903 | 8/1971 | Johnson | 178/18 |
| 3,624,293 | 11/1971 | Baxter | 178/18 |
| 3,647,963 | 3/1972 | Bailey | 178/19 |
| 3,699,253 | 10/1972 | Freedman | 178/19 |
| 3,819,857 | 6/1974 | Inokuchi | 178/19 |
| 3,846,580 | 11/1974 | Brenner | 178/19 |
| 3,873,770 | 3/1975 | Ioannou | 178/18 |
| 4,143,240 | 3/1979 | Kobayashi et al. | 178/19 |

FOREIGN PATENT DOCUMENTS

| | | | |
|---|---|---|---|
| 1024019 | 3/1966 | United Kingdom | 178/19 |
| 1306040 | 2/1973 | United Kingdom | 178/19 |
| 1340522 | 12/1973 | United Kingdom | 178/18 |
| 1341676 | 12/1973 | United Kingdom | 178/19 |
| 1350113 | 4/1974 | United Kingdom | 178/19 |

OTHER PUBLICATIONS

Hiraki et al., "A New Graphic Input Device by Means of Resistive Phase Shifters", *El. and Comm. in Japan*, vol. 57-A, No. 10, 1974, pp. 4–12.

*Primary Examiner*—Leo H. Boudreau
*Attorney, Agent, or Firm*—Larson, Taylor and Hinds

[57] ABSTRACT

Position sensing apparatus comprising two coil arrangements movable relative to each other, the first arrangement being a side-by-side array of elongate coil loops defining a writing area and the second coil arrangement being a single or multiple coil loose coupled with the coil loops in the array. The coil loops in the side-by-side array have phase-shifting units between them so that they give an output which is unambiguously and progressively phase-characterized dependent upon the position of the second coil arrangement on the writing area in the direction of the array. Two layers of the elongate coil loops can be provided so that the coil loops in one layer are at right angles to those in the other to give "x" or "y" co-ordinate positioning. The phase shift over the writing area may be less than 360°, or greater than 360° with the use of an ambiguity eliminating circuit. The second coil arrangement may comprise two coils carried on a pen and spaced from the pen tip and connected so that indefiniteness does not arise as the pen is tilted. Apparatus according to the invention may have its output processed for line transmission for stock ordering and accounting purposes or for signature verification.

7 Claims, 8 Drawing Figures

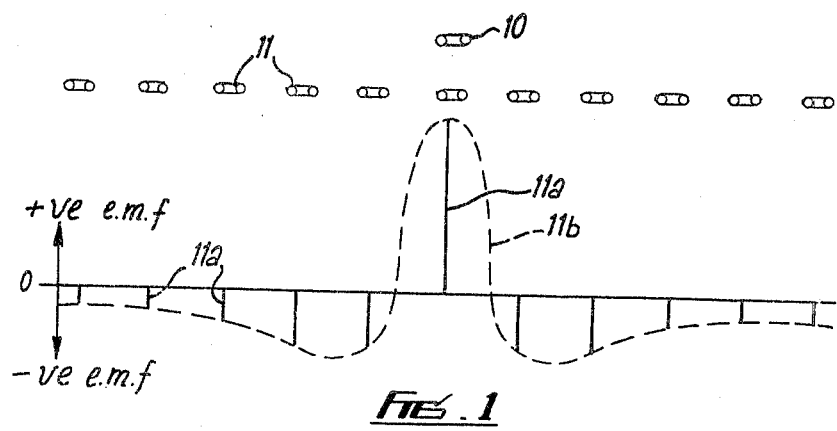
_FIG. 1_
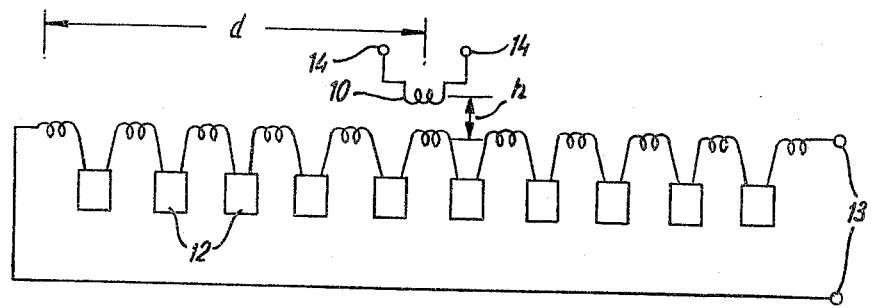
_FIG. 2_
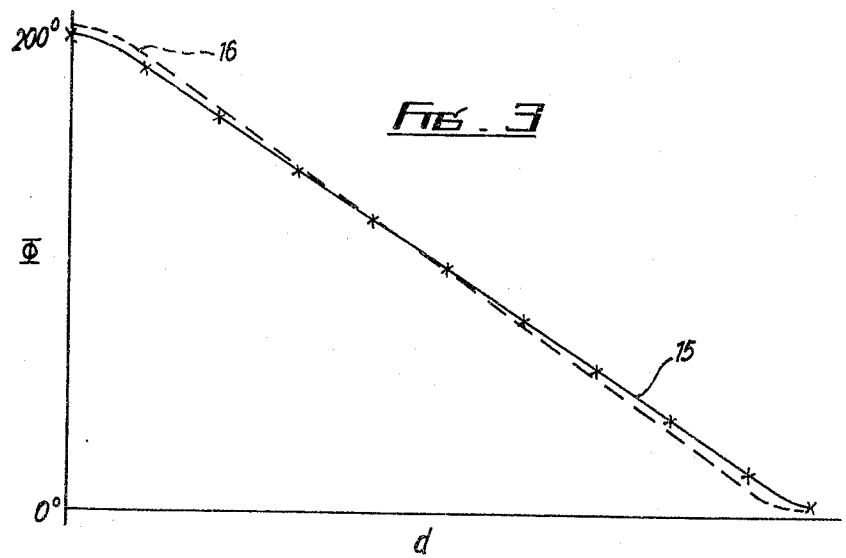
_FIG. 3_

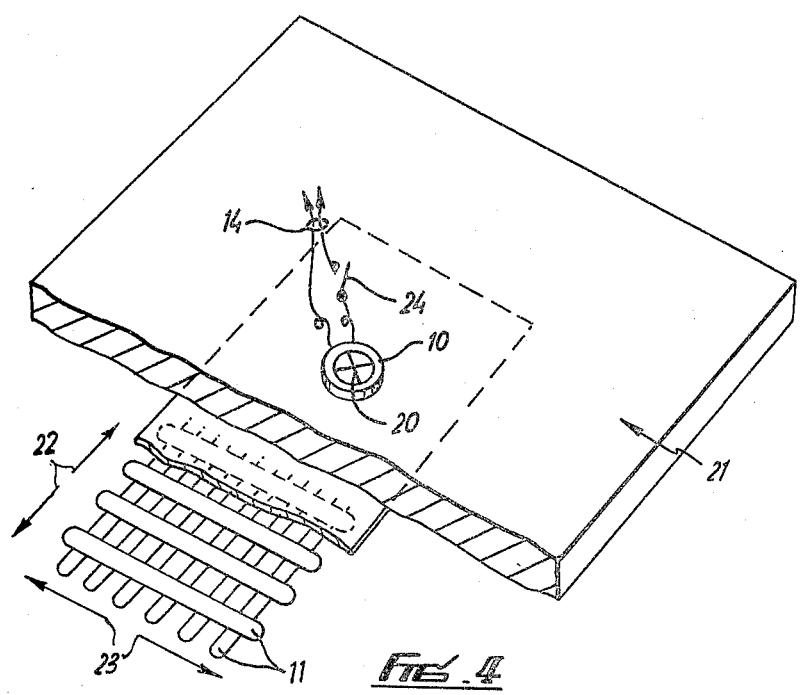
FIG. 4
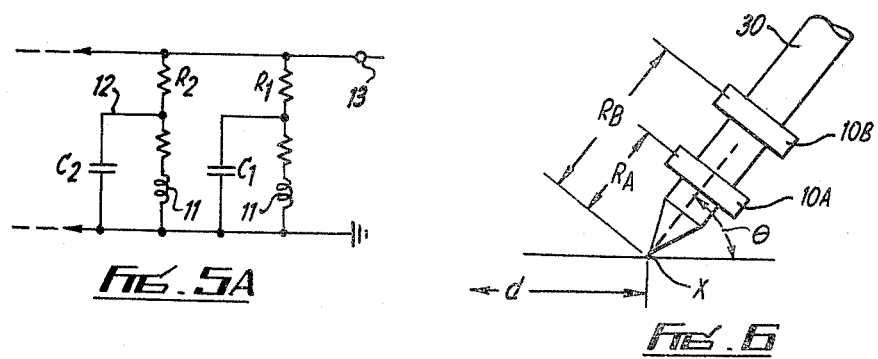
FIG. 5A
FIG. 6
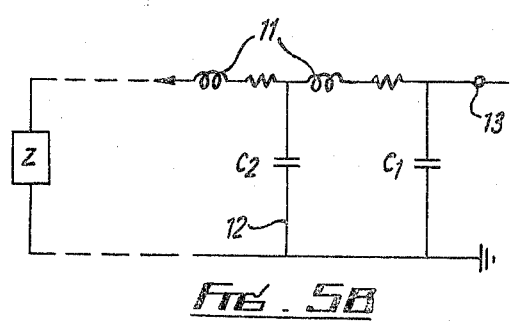
FIG. 5B

POSITION SENSING APPARATUS

This invention relates to positioning sensing apparatus.

Many forms of apparatus are known wherein the position of one component (frequently referred to as a "pen" or "cursor") can be identified relative to another component. Such apparatus, depending on use, can be identified as Data Tablets, Signature Verefiers, Line Tracers, Chart Readers, Co-ordinate Locators etc. Such apparatus can involve a diversity of technologies. For example in Great Britain Pat. No. 1,310,683 a form of apparatus is shown in which pressure generated by a pen affects the contact position between two resistive sheets. In U.S. Pat. No. 2,925,467 a conducting stylus functions as a movable contact on a resistive tablet. U.S. Pat. No. 3,626,483 discloses a sonic arrangement. Great Britain Pat. No. 982,008 has contact sheets on which a pen can write, the sheets being separated by an oil film. Other devices, such as shown in Great Britain Pat. No. 1,306,040 (which cross refer to U.S. Pat. No. 2,988,643 and U.S. Pat. No. 3,135,857 showing optical systems) use mechanical servo arrangements. Laser systems are also known.

From this complexity of technologies apparatus which is highly sensitive, structurally robust, stable, relatively inexpensive, and free of movable parts other than that of the pen or cursor, does not arise. For apparatus to have this specification one looks to electromagnetic devices and reference is made in this respect to the disclosure of Great Britain Pat. Nos. 1,304,376 and 1,350,113 in the name of the Bendix Corporation (U.S. Application Ser. Nos. 805,559 and 79,582 respectively). These specifications disclose an "x", "y" co-ordinate axis system in which, for each axis there is, at one level, a single conductor providing a plurality of equally spaced long parallel portions and at another level a similar single conductor known as a "quadrature conductor". Thus, for both "x" and "y" axes there are four conductors at various levels and these define a tablet area which can be traversed by a pen or cursor in the form of a coil which is related in sixe to the spacing of the parallel portions of the conductors and which must be close coupled with the conductors, although with four layers, this can introduce problems.

In use of this system it is thought to be essential to move the pen always from a set zero position. If the pen is placed at random on the board an ambiguous reading of position would be obtained. This system is also believed to involve problems with "neutralising" the effects of the return wire from the end of the single conductor to the source which energises the conductor.

The present invention provides improved position sensing apparatus as stated in the appended claims.

The advantages which arise from use of the present invention are as follows:

(a) for each axis only one layer of conductors is necessary. This simplifies design and it allows a compact apparatus to be designed.

(b) the coupling between a pen and the layer of conductors can be loose and hence more freedom in design in possible. A thick robust writing surface, for example, can be provided between the pen and the layer of conductors without affecting accuracy or sensitivity significantly.

(c) the pen can be placed anywhere above the layer of conductors and no ambiguity arises. There is no need to move the pen from a set zero position.

(d) a high sensitivity is possible, such as the sensing of a position to an accuracy of a tenth of millimeter for example.

The invention will now be described further with reference to the accompanying drawings in which:

FIG. 1 is a diagram of first and second coil arrangements with a graph showing induced e.m.f's;

FIG. 2 is an elementary circuit diagram showing parts of a position sensing apparatus according to the invention;

FIG. 3 is a graph showing how the phase of a phase-characterised signal varies with relative displacement of the coil arrangements in the circuit shown in FIG. 2;

FIG. 4 is a diagrammatic representation of a writing tablet including position sensing apparatus according to the present invention;

FIGS. 5A and 5B show respectively parallel and series connected coils in an array with phase shift units;

FIG. 6 is a diagram in support of a mathematical explanation;

Figure 7:
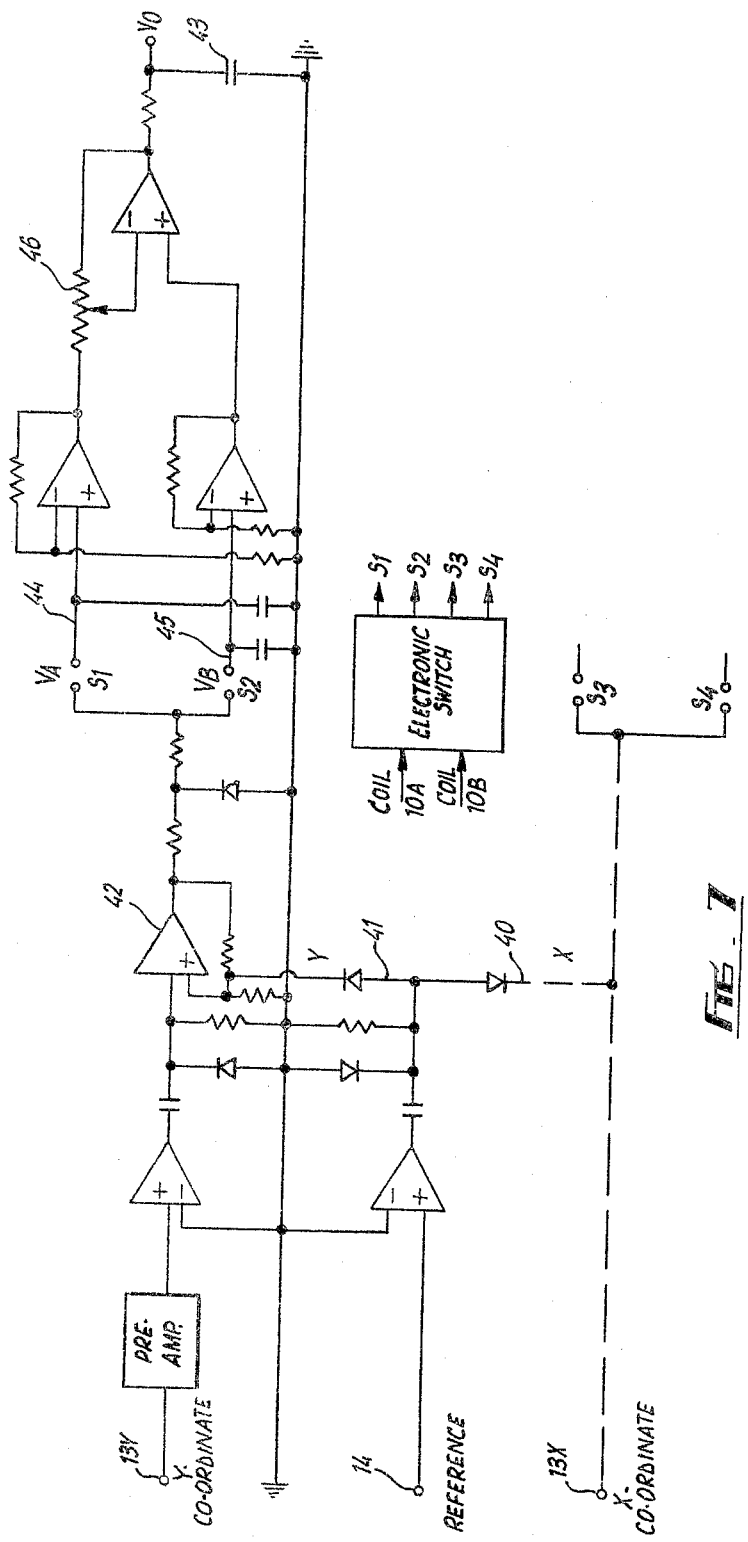
FIG. 7 shows a writing tablet amplifier.

FIG. 1 shows a coil 10, of a second coil arrangement, of circular shape positioned over coils 11 of loop shape of a first coil arrangement. The coils 10 and 11 are loosely coupled. That is the distance between coils 10 and 11 is preferably the same as or more than the spacing between coils 11. The coupling is loose so that the movement of coil 10 produces a smooth output from coils 11 as explained later with reference to FIG. 3. The coils 11 are of elongate shape, FIG. 1 showing the narrower dimension, so that they have lengths greater than their widths. The major axes of the coils are mounted laterally to each other. For the position shown in FIG. 1 with coil 10 centred on the array coils 11, and for an A.C. input to coil 10, e.m.f's 11a are induced in the coils 11 having magnitudes as indicated in the graph immediately below coils 11. The dotted envelope 11b represents the theoretical position of "infinite" coils 11. If phase shift units 12 are inserted between the coils 11 (shown in circuit diagram form in FIG. 2) and the coils 11 and units 12 are connected in series (see also FIG. 5B) then a signal is obtained at terminals 13 which is phase displaced relative to the input signal applied at terminals 14 of coil 10, to extent of phase displacement being unambiguously related to the position coil 10 has along the coils 11. For a constant phase displacemeny at each unit 12, and with loose coupling between coils 10 and 11, the relationship of phase to movement of coil 10 can be made nearly linear. Where there is a departure from linearity (more noticeable with end effects arising at the limits of displacement of the coil 10) the linearity can be restored by appropriate selection of phase displacement in each circuit 12 or by the provision of additional coils to give the array of coils 11 the appearance of having an infinite length. A graph 15 of coil 10 displacement "d" against phase displacement $\Phi$ is shown in FIG. 3. The graph 16 shows the effect of altering the distance h (FIG. 2) between coil 10 and coils 11 whilst maintaining loose coupling. The effect is not a major one. If the coupling is made close the graph 15 would have peaks and thus linearity would be destroyed.

The coils 11 could be connected in parallel (see FIG. 5A). In this event each is provided with a phase displacement unit 12.

Phase displacement in each unit 12 is typically between 10° to 45° but could be as high as 120° and may be chosen in relation to the number of coils so that the overall phase shift is less than 360° but could be more by including an ambiguity eliminating circuit. Such a circuit could include a further set of phase shift circuits 12 but with a smaller phase shift. One set of circuits 12 would provide one output 13 and the other set would provide another output 13. The two outputs could be combined to give a single ambiguity free arrangement. The ratio of distance h between coil 10 and array coils 11 to the width of one of the coils 11 is preferably in the range of 2 to 4.

FIG. 4 shows the invention set up in the form of a writing tablet.

The coil 10 has a hollow centre into which is fitted a lens with cross hairs 20. The coil 10 is movable by hand over the surface on table 21. Between the coil 10 and table 21 there could typically be a drawing, a graph, a schedule of parts or a shape, details of which have to be recorded, displayed, or transmitted. Fastened under the table 21 there are two arrays 22, 23 of coils 11, array 22 extending in one direction or axis parallel to the plane of the table 21 and array 23 extending in the co-ordinate direction or axis also parallel to the plane of the table 21.

Movement of coil 10, when powered from an A.C. supply (such as one of 1 to 20 KHZ frequency) will produce from each array a phase-characterised signal from which can be derived output signals for storage, display, processing or transmission. Power to coil 10 is shown under control of a switch 24 which can be closed when the coil is correctly located over a point of interest on the surface 21. The switch could be foot operated or finger operated on the side of the coil, or pressure operated by pressing down on the coil.

The moving coil arrangement may consist of more than one coil. This is illustrated in FIG. 6 where a pen 30 is provided with two coils 10A and 10B, displaced from the point of the pen and displaced from each other along the length of the pen. They are powered alternately from a common supply. When the pen is vertical the coils behave like a single coil positioned at a location distance d from a datum point. However, the point of the pen will not be readily visible to a user, as may be required if it is to be used to trace over an outline. This lack of visibility will cause the user of the pen to tilt the pen. If there were only one coil then a positional error arises as the coil position in the d direction has changed with tilting and, to less effect, the height of the coil above a datum has changed and the orientation of the coil has changed. With the second coil present a "tilt-differential" signal can be derived which can be fed into the phase-characterised signal derived from the array coils to bring about correction for the tilt.

Using the symbols on FIG. 6 the matters discussed above can be treated mathematically. Let $V_d$ be the output voltage from the apparatus (i.e. voltage at terminals 13 in FIG. 2) when coils 10A and 10B are vertically above a point X. When the pen tilts coil 10A will give an apparatus output voltage $V_A$ where:

$$V_A = V_d + KR_A \cos \theta \qquad (i)$$

and K is the ideally constant voltage per unit length of d and $\theta$ is the angle the pen makes with the horizontal. Coil 10B will give an apparatus output voltage $V_B$ where:

$$V_b = V_d + KR_B \cos \theta \qquad (ii)$$

If $R_B$ is selected to be twice $R_A$ then from equation (ii)

$$V_B = V_d + 2KR_A \cos \theta \qquad (iii)$$

and $$V_B - V_A = KR_A \cos \theta \qquad (iv)$$

If this difference signal (iv) is subtracted from $V_A$ (i) then a voltage is derived which is the voltage proper to be recorded when the tip of the pen is at X. It is independent of pen tilt.

The difference signal may be used as a signal proportional to pen angle or, when differentiated may be used to obtain angular velocity of the pen. Such information can be of importance in signature verification. The pen could be provided with a pressure sensitive switch so that it only functioned when the pen tip contacts a writing surface.

In FIG. 7, X and Y co-ordinate phase characterised signals (such as may arise from arrays 22 and 23 in FIG. 4) are connected respectively to amplifier input terminals 13X and 13Y. A reference signal tapped from a local coil 10 is connected to amplifier input terminal 14. The reference signal receives one stage of amplification which is fed respectively to the X and Y sections of the amplifier via connectors 40 and 41. (Only the Y section is described below). The signal at terminal 13Y is given two stages of amplification whereafter it is used with the amplified reference signal Y to switch on and off a filp-flop circuit 42 to give a mark/space waveform which is smoothed in circuit 43, 44 and 45 to give an apparatus output signal Vo.

The circuit of FIG. 7 is designed to work on conjunction with a pen with two coils (FIG. 6) thus there are two parallel circuits 44, 45 which can operate alternately in synchronism with powering of coils 10A, 10B and a compensation circuit 46 to provide the differential signal (iv) referred to above.

In a modification, the coil arrangement 10 may include its own power supply and oscillator so that there are no connecting wires. This is very advantageous when the coil arrangement 10 is mounted on a "conventional" pen. To provide a reference signal against which phase can be related, a single coil would be provided surrounding the area occupied by coil arrangement 11.

Alternatively, where wires are provided to coil arrangement 10, the wire could also be used to hold the coil captive or be incorporated in a lead holding a pen, which includes the coil, captive.

It would be possible to make the coil arrangement 10 null seeking in response to phase related signals supplied to coils in the coil arrangement 11, so that coil 10 could be moved.

Both coil arrangements 10, 11 could be included in a single piece of apparatus, such as a safe, with coil 10 mounted on a cordless pen, and the writing surface 21 being a part or on the apparatus and coil arrangement 11 being below surface 21. Signature verification circuits could be included in the apparatus which could then be stimulated by a verified signature or mark.

In another application the table 21 has applied to it some printed information such as a list of goods with empty "boxes" alongside each item of goods. The boxes could be marked with a pen 30 to indicate the stock of the goods that are held or that more stock of the goods identified by the pen are required. In an improved arrangement the marking could be by letters or numbers or both to indicate typically the number and sizes of goods in stock or goods required.

The output from table 21 could then be supplied to a microprocessor and the output of the micro-processor fed to a central computer that could be programmed to perform a number of operations such as might be involved with stock accounting and supply.

The phase-characterised output signal from apparatus according to the invention can be processed in a number of ways. Two examples will be given:

EXAMPLE I

A pulse derived from a zero cross-over detector acting on a reference signal is held by a flip flop or monostable which opens an AND gate and permits clock pulses from a clock pulse generator to pass into a register. A pulse derived from a zero cross-over detector acting on a phase-characterised signal switches off the AND gate and thus the number of clock pulses in the register is a measure of the phase angle.

EXAMPLE II

A pulse derived from a zero cross-over detector acting on a reference signal sets a flip flop and a pulse derived from a zero cross-over detector acting on a phase-characterised signal resets the flip flop to zero. The output of the flip flop during the ON time is limited to a precise voltage and to zero voltage during the OFF time. This is called a variable mark/space system where the average output voltage is proportional to the relative timing of the two pulses and therefore the phase position. Thus, for a movement of the local coil arrangement across the array coil arrangement, the output signal voltage changes from zero to a maximum. Moreover, by differentiating the output signals by known methods, velocity and acceleration may be obtained.

The coils 11 may be fixed below writing surface made of wood, or any non-conducting and non-magnetic material of any thickness within limits set by the initial design to form a writing tablet. The apparatus of the invention will also work when placed below some metal surfaces (with certain limitations); stainless steel for example being effectively non-conducting at operational frequencies of 2 to 10 KHZ.

By use of the invention it is possible to provide a position sensing apparatus having a writing surface which is completely plain and free from anything above it other than a pen. Thus the apparatus, with a conventional looking pen, can, if necessary for security purposes, be completely concealed even when in use.

The invention has application to a number of fields such as transferring data on a surface to a store, to a display, to a transmitter or to a comparator. The data could typically be in graph form and transferred in digital form to a computer programmed to analyse the data. The data could be a signature which has to be transferred for verification by comparison with a reference signature. As a means of signature verification, the invention has certain advantages; reference data against which a comparison has to be made, can be stored at a point remote from where the signature is made and it may be kept concealed so that it cannot be photographed or reproduced.

The invention has use in conjunction with processors and transmission lines for transmitting cursive and non-cursive writing and recognition.

The invention is suitable for providing apparatus in many different sizes. The length of the coils 11 may typically be up to 1000 millimeters in length. The width of the coils 11 may be in the range of a few millimeters to fifty millimeters. Usually there will only be a small space between the coils 11. The size of the coil 10 is not critical. If it is to be carried on a pen then it will have a size such that the pen is not cumbersome or so that it can be concealed in the pen.

I claim:
1. Position sensing apparatus comprising:
    a first coil arrangement comprising a multiplicity of at least three coil loops each shaped to have a length greater than its width and mounted with their major axes lateral to each other and occupying a defined area;
    a second coil arrangement positioned so as to be loosely coupled electromagnetically to the first coil arrangement over said defined area;
    means for applying an alternating current input signal to one coil arrangement;
    phase shifting units connected with the coil loops of the first coil arrangement so that the coil loops and units define a network having a progressive angle phase change characteristic; and
    output terminals for said network so that at the output terminals, a signal is produced which is characterized by progressive phase shift to be unambiguously representative of the relative positioning of the two coil arrangements.
2. Position sensing apparatus as claimed in claim 1 in which the parameters of the phase shifting units are such that the phase shift per unit is in the range of 10 to 45 degrees and the phase shift over said network is less than 360°.
3. Position sensing apparatus as claimed in claim 1 in which the parameters of the phase shifting units are such that the phase shift over said network is greater than 360° and an ambiguity eliminating circuit is provided so that a position represented by a phase shift in the range of 0–360 degrees is distinguishable from a phase shift in higher ranges.
4. Position sensing apparatus as claimed in claim 3 in which the ambiguity eliminating circuit includes two sets of phase shift circuits one set having a greater phase shift per pair of adjacent coils then the other and each set providing an output, and means combining said outputs.
5. Position sensing apparatus as claimed in claim 1 in which the second coil arrangement is carried on a pointed member simulating a pen and the first coil arrangement is located below a tablet of non-magnetic material.
6. Position sensing apparatus as claimed in claim 5 in which the second coil arrangement comprises two coils spaced apart on said pointed member in which the spacing of one of said two coils from the point of the member is twice the spacing of the other coil from said point.
7. Position sensing apparatus comprising:
    a tablet of non-magnetic material having below the surface thereof an X-array and a Y-array of side-by-side elongate coil loops, each loop having a length greater than its width;
    a pen carrying a coil positioned so as to be movable over the tablet and loosely coupled electro-magnetically to said coil loops;
    means for applying an alternating current input signal to the coil carried on the pen;

phase shifting units connected with the coil loops of the X-array so that the coil loops and units define an X-network having a progressive phase change characteristic;

phase shifting units connected with the coil loops of the Y-array so that those coil loops and units define a Y-network having a progressive phase change characteristic;

output terminals for each of said networks at each of which a signal is produced with is characterized by progressive phase shift to be unambiguously representative of the position of the pen on the tablet on respective X and Y axes.

* * * * *